United States Patent [19]
Mayer

[11] Patent Number: 5,608,573
[45] Date of Patent: Mar. 4, 1997

[54] GUIDE DEVICE AND METHOD FOR THE BACKLASH-FREE ALIGNMENT OF MUTUALLY RELATIVELY DISPLACEABLE PARTS OF AN OPTICAL INSTRUMENT

[75] Inventor: Thomas Mayer, Hohenems, Austria

[73] Assignee: Leica AG, Heerbrugg, Switzerland

[21] Appl. No.: 362,230

[22] Filed: Dec. 23, 1994

[30] Foreign Application Priority Data

Dec. 24, 1993 [DE] Germany ..................... 43 44 605.1

[51] Int. Cl.⁶ ............... F16H 55/18; G02B 7/02
[52] U.S. Cl. ............... 359/392; 359/393; 74/409
[58] Field of Search .................. 359/391–394, 359/373, 374; 74/409, 440

[56] References Cited

U.S. PATENT DOCUMENTS

| | | | |
|---|---|---|---|
| 4,130,024 | 12/1978 | Hayasaka et al. | 74/29 |
| 4,189,953 | 2/1980 | Volk | 74/479 |
| 4,279,173 | 7/1981 | Krebs et al. | 74/441 |
| 4,322,151 | 3/1982 | Weiss | 354/196 |
| 4,515,439 | 5/1985 | Esswein | 350/257 |
| 4,616,517 | 10/1986 | Esmay | 74/10.45 |

FOREIGN PATENT DOCUMENTS

| | | |
|---|---|---|
| 2207550 | 6/1974 | France . |
| 2674918 | 10/1992 | France . |
| 469955 | 1/1929 | Germany . |
| 1051025 | 2/1959 | Germany . |
| 1924400 | 8/1973 | Germany . |
| 2047532 | 4/1975 | Germany . |
| 2729234 | 1/1978 | Germany . |

*Primary Examiner*—Timothy P. Callahan
*Assistant Examiner*—Eunja Shin
*Attorney, Agent, or Firm*—Foley & Lardner

[57] ABSTRACT

A guide device for the backlash-free alignment of mutually relatively displaceable parts of an optical instrument, preferably of a rack-and-pinion housing of a microscope on a profile column. The rack-and-pinion housing is constructed with a gearing such that it can be moved along the profile column. Arranged between the rack-and-pinion housing and the profile column are a plurality of sliding elements (8), which are firstly constructed resiliently and form a force-closed connection between the rack-and-pinion housing and the profile column. For the purpose of fixing in the rack-and-pinion housing, the sliding elements (8) have a receptacle (11) for inserting an adhesive. After curing the adhesive, the sliding elements (8) lose their spring action.

19 Claims, 2 Drawing Sheets

GUIDE DEVICE AND METHOD FOR THE BACKLASH-FREE ALIGNMENT OF MUTUALLY RELATIVELY DISPLACEABLE PARTS OF AN OPTICAL INSTRUMENT

BACKGROUND OF THE INVENTION

The invention relates to a guide device and method for the backlash-free alignment of mutually relatively displaceable parts of an optical instrument.

Optical instruments, in particular microscopes or their object stages, are moved for focusing purposes via a rack-and-pinion housing along a fixed profile column. In relation to the displacement on the profile column, very high demands are made for the precise alignment of the guide elements and the precise compliance with this direction of movement. In order to guarantee this, highly accurate axial or radial guides having sliding or rolling members are used between the profile column and the rack-and-pinion housing. However, these guide elements place very stringent requirements on the manufacturing accuracy of the individual components over the entire length of the profile column. An adjustment of the guide elements is indispensable in order to compensate existing inaccuracies in the guide tracks.

DE-C 469 955 discloses an elastically constructed tubular guide for a microscope, in which coil springs are used to press the sliding surface of a guide rod against the sliding surface of a guide block in such a way that there is a constant pressure against the respective sliding surfaces.

DE-B 19 24 400 and FR 2 207 550 disclose mechanical guide elements in which two parts which can move against one another and between which roller bearings are arranged are adjusted by springs. After adjustment is performed, the spring action is canceled by sealing cavities by means of a casting resin.

DE-C 1 051 025 discloses a backlash-compensating device for setting optical instruments which has two parts arranged movably relative to one another. The parts which can move relative to one another are supported by bearings which are designed with a plastic insert which can be elastically compressed. The strip-shaped plastic inserts are located partially in one groove each and form the sliding bearing surfaces with their parts which project over the groove.

In the case of assembly, such plastic inserts of fixed thickness have the disadvantage that backlash compensation is possible only in very narrow tolerances or that a multiplicity of different material thicknesses must be made available.

SUMMARY OF THE INVENTION

It is therefore an object of the invention to construct the sliding elements in such a way that they can also be used in the case of differing and relatively large tolerances.

This and other objects are achieved according to the invention by a guide device for the backlash-free alignment of first and second mutually relatively displaceable parts, comprising a plurality of resiliently constructed sliding elements arranged between the first and second parts to produce a force-closed connection between the first and second parts; the first part having a plurality of grooves for accommodating the sliding elements; wherein the grooves are respectively constructed in a stepped fashion and each sliding element includes integrally formed spring lugs and a receptacle for inserting an adhesive; and wherein the sliding elements become fixed in position on the first part, with the loss of their spring action, after insertion and curing of the adhesive.

Preferably, each sliding element is a generally rectangular component and includes circumferential webs for forming the adhesive receptacle and one of the circumferential webs includes a bore for filling in the adhesive. The integrally formed spring lugs may be disposed on two longitudinal sides of the sliding element, outside the circumferential webs. An external surface of each sliding element preferably includes a planar sliding surface. The interior of the adhesive receptacle may include projections integrally formed respectively opposite one another.

Another aspect of the invention is a method for the backlash-free alignment of first and second mutually relatively displaceable parts, comprising the steps of mounting the first part on the second part; providing a plurality of sliding elements each having spring lugs and an adhesive receptacle; placing the plurality of sliding elements between the first and second parts to produce a force-closed connection between the first and second parts; and fixing the plurality of sliding elements in position on the first part, with the loss of their spring action, by inserting adhesive in the receptacles and curing the adhesive.

Preferably, the mounting step includes setting a backlash between a pinion of the rack-and-pinion housing and a rack of the profile column. The setting step may include inserting a distance piece into an upper cutout between the rack and pinion housing and the rack of the profile column. The setting step may further include aligning the rack-and-pinion housing on the profile column by inserting wedges into mutually opposite cutouts between the rack-and-pinion housing and the profile column.

The placing step preferably includes placing the plurality of sliding elements in corresponding grooves of the rack-and-pinion housing such that the spring lugs point toward the rack-and-pinion housing and sliding surfaces of the plurality of sliding elements press into guide tracks of the profile column.

The method advantageously further comprises, after the step of curing the adhesive, the step of removing the distance piece and the wedges.

Further objects, features, and advantages of the invention will become apparent from the following detailed description taken in conjunction with the accompanying drawings.

BRIEF DESCRIPTION OF THE DRAWINGS

The drawings are hereby expressly made a part of the specification. The invention is explained in more detail below in an exemplary embodiment with the aid of the diagrammatic drawings, in which.

DETAILED DESCRIPTION OF THE PREFERRED EMBODIMENTS

An advantage of the invention is the result of the resilient construction of the sliding elements in the assembled state so that the most varied clearance tolerances can be compensated between the rack-and-pinion housing surrounding the profile column and the profile column of the microscope. Fixing the sliding elements is performed accordingly in a simple way by inserting a suitable adhesive between the sliding element and the rack-and-pinion housing.

After curing the adhesive, the sliding elements lose their resilient property and form a backlash-free bearing between the fixed and movable microscope parts. At the same time, the backlash between the rack attached to the profile column and the pinion mounted in the rack-and-pinion housing is also thereby canceled. Any possible wagging, tilting or swivelling movements of the rack-and-pinion housing during movement along the profile column are thereby excluded.

Figure 1:
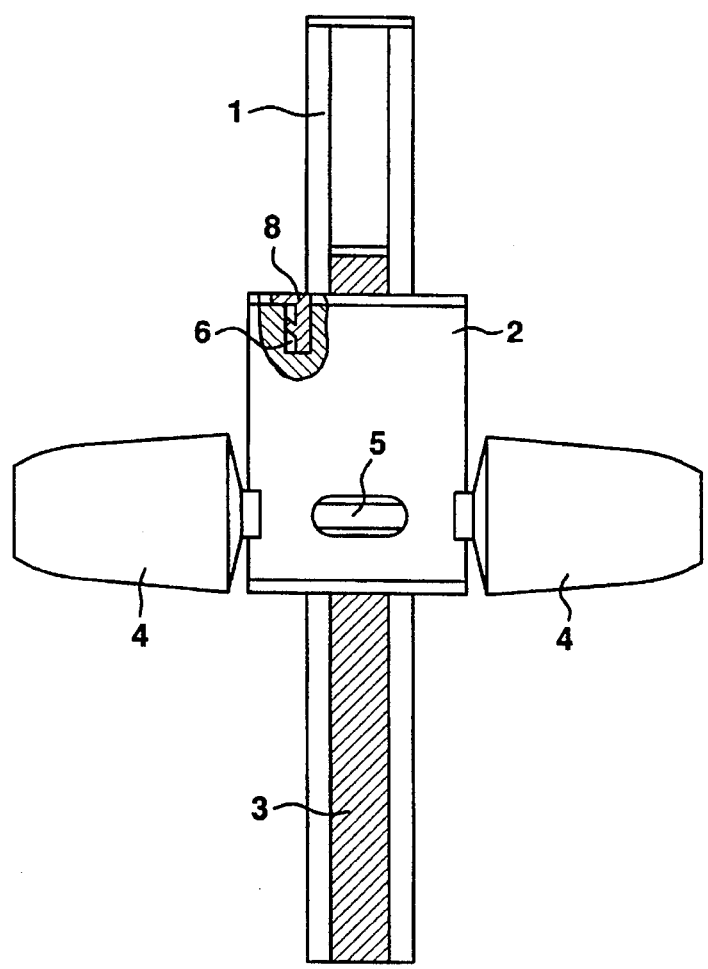
FIG. 1 shows a view of the profile column with a rack-and-pinion housing attached thereto.

FIG. 1 shows a view of the profile column 1 of a microscope with a rack-and-pinion housing 2 arranged thereon. The profile column 1 has a rack 3 which is connected by gearing to the drive knobs 4 via a shaft 5 mounted in the rack-and-pinion housing 2 and a pinion (not represented). A plurality of grooves 6 for accommodating sliding elements 8 are provided in the rack-and-pinion housing 2. The rack-and-pinion housing 2 can be moved along the fixed profile column 1 by the drive knobs 4, the shaft 5 and the rack 3.

Figure 2:
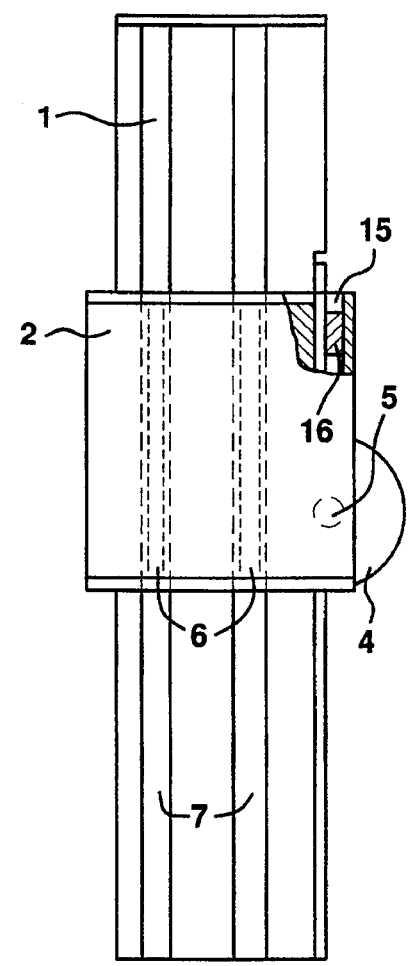
FIG. 2 shows a side view of the profile column with rack-and-pinion housing.

FIG. 2 shows a side view of the profile column 1 with two deeper-lying guide tracks 7 and the mounted rack-and-pinion housing 2. The grooves 6 in the rack-and-pinion housing 2 are constructed in a stepped fashion and situated opposite the guide tracks 7. The averted side of the profile column 1 and of the rack-and-pinion housing 2 is constructed in the same way. One of the sliding elements 8 is respectively inserted at the upper and lower ends in each of the grooves 6.

Figure 3:
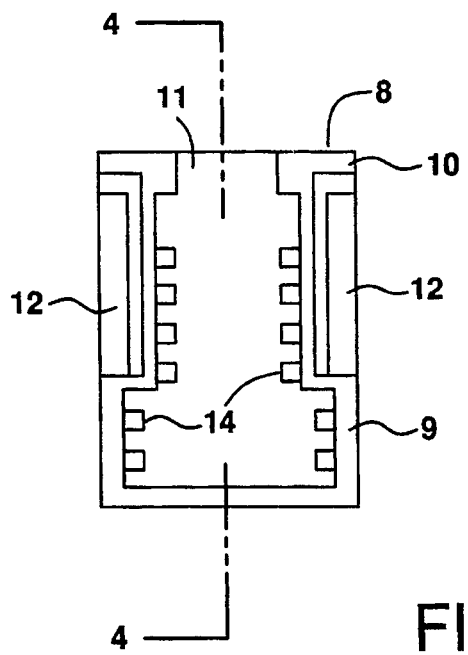
FIG. 3 shows the sliding element in a top view.

FIG. 3 shows a sliding element 8 which is designed as a rectangular injection-molded part and has circumferential webs 9, 10 and two spring lugs 12 integrally formed on the longitudinal sides. The circumferential webs 9, 10 form a box-shaped interior. Furthermore, there is provided in the web 10 a bore 11 through which the adhesive can be pressed into the box-shaped interior. Projections 14 are integrally formed on the webs 9 for the purpose of better adhesion of the adhesive.

Figure 4:
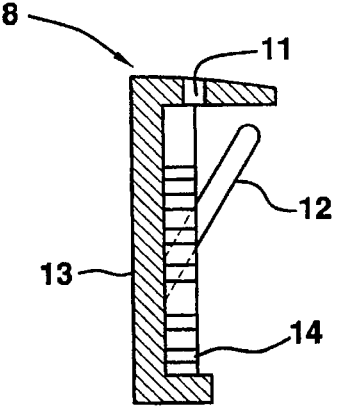
FIG. 4 shows a cross-sectional view of the sliding element along the line 4—4 of FIG. 3.
Figure 6:
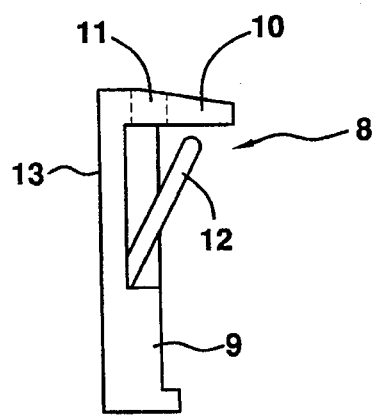
FIG. 6 shows a side view of FIG. 3 viewed from the left side.

FIG. 6 shows a side view of the sliding element 8 with the two spring lugs 12 and the circumferential webs 9, 10. FIG. 4 shows a section through the sliding element 8 of FIG. 3. The outside of the sliding element 8 is constructed as a sliding surface 13. The resilient ends of the spring lugs 12 project over the webs 9. On being inserted into the grooves 6, the spring lugs 12 are supported on the higher-lying steps of the grooves 6. Thus the lower portion of the groove 6 forms with the interior of the sliding element 8 a space to accommodate an adhesive.

Figure 5:
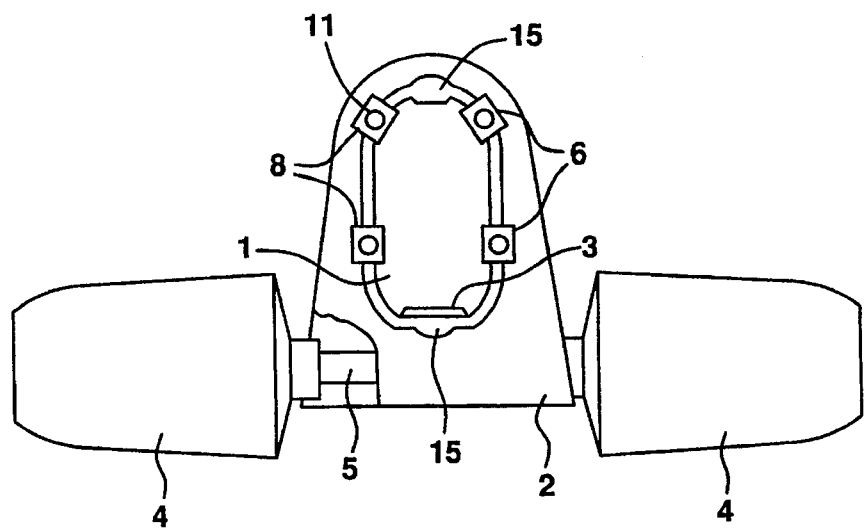
FIG. 5 shows the profile column and rack-and-pinion housing in a partially cutaway representation.

FIG. 5 shows a section through the profile column and the rack-and-pinion housing 2. The sliding elements 8 are inserted in the grooves 6 provided for the purpose in such a way that the spring lugs 12 point in the direction of the rack-and-pinion housing 2. The respective sliding surfaces 13 of the individual elements 8 are situated in the guide tracks 7 of the profile column 1 and thus form a sliding bearing.

When the rack-and-pinion housing 2 is assembled on the profile column 1, the rack-and-pinion housing 2 is pushed over the column 1 and the pinion on the shaft 5 is brought into engagement with the rack 3. To set the back-lash between the pinion and rack, a distance piece 16 is inserted into an upper cutout 15 (FIG. 2) between the rack-and-pinion housing 2 and the rack 3. To align the rack-and-pinion housing 2 on the profile column 1, wedges are then inserted into further mutually opposite cutouts 15 between the rack-and-pinion housing 2 and profile column 1. The rack-and-pinion housing 2 is thus firmly mounted on the column 1. The sliding elements 8 are now arranged in the corresponding grooves 6 of the rack-and-pinion housing in such a way that the spring lugs 12 point in the direction of the rack-and-pinion housing 2 and the sliding surfaces 13 press into the guide tracks 7 of the profile column 1. This force-closed connection between the sliding surface 13 and guide track 7 is fixed due to the fact that a defined quantity of adhesive which cures between the interior of the sliding element 8 and the groove 6 is inserted via the bore 11 in the web 10.

The sliding elements 8 are constructed in such a way that a suitable, preferably a very viscous adhesive can flow through the bore 11 and, after filling of the box-shaped interior, also past the spring lugs 12.

After curing the adhesive, in the total of eight inserted sliding elements 8, the spring lugs 12 lose their spring action. The assembly aids, for example, the distance piece and the wedges in the cutouts 15 can then be removed.

The invention is not, of course, limited to the exemplary embodiment described, since it is certainly within the scope of the invention to use the sliding elements also in radial bearings, it being necessary to adapt the sliding surface 13 to the radius of the shaft to be supported. The sliding elements have been described as single-piece injection-molded parts made from plastic. However, they can also be produced from coated metal or from hardened and ground steel.

While the invention has been disclosed with reference to certain described embodiments, numerous alterations, modifications, and changes to the described embodiments are possible without departing from the spirit and scope of the invention, as defined in the appended claims and equivalents thereof.

What is claimed is:

1. A guide device for the backlash-free alignment of first and second mutually relatively displaceable parts, comprising:

a plurality of resiliently constructed sliding elements arranged between the first and second parts to produce a force-closed connection between the first and second parts;

the first part having a plurality of grooves for accommodating the sliding elements;

wherein the grooves are respectively constructed in a stepped fashion and each sliding element includes integrally formed spring lugs and a receptacle for inserting an adhesive; and wherein the sliding elements become fixed in position on the first part, with the loss of their spring action, after insertion and curing of the adhesive.

2. The guide device of claim 1, wherein each sliding element is a generally rectangular component and includes circumferential webs for forming the adhesive receptacle.

3. The guide device of claim 2, wherein one of the circumferential webs includes a bore for filling in the adhesive.

4. The guide device of claim 2, wherein the integrally formed spring lugs are disposed on two longitudinal sides of the sliding element, outside the circumferential webs.

5. The guide device of claim 1, wherein an external surface of each sliding element includes a planar sliding surface.

6. The guide device of claim 2, wherein an interior of the adhesive receptacle includes projections integrally formed respectively opposite one another.

7. The guide device of claim 1, wherein the first part includes a rack-and-pinion housing and the second part includes a profile column.

8. The guide device of claim 7, wherein the first and second parts are part of an optical instrument.

9. The guide device of claim 8, wherein the optical instrument includes a microscope.

10. A method for the backlash-free alignment of first and second mutually relatively displaceable parts, comprising the steps of:

mounting the first part on the second part;

providing a plurality of sliding elements each having spring lugs and an adhesive receptacle;

placing the plurality of sliding elements between the first and second parts to produce a force-closed connection between the first and second parts; and fixing the plurality of sliding elements in position on the first part, with the loss of their spring action, by inserting adhesive in the receptacles and curing the adhesive.

11. The method of claim 10, wherein the providing step includes providing a plurality of sliding elements wherein each sliding element is a generally rectangular component and includes circumferential webs for forming the adhesive receptacle.

12. The method of claim 11, wherein the step of inserting adhesive includes inserting adhesive through a bore formed in one of the circumferential webs.

13. The method of claim 10, wherein the mounting step includes mounting a first part including a rack-and-pinion housing on a second part including a profile column.

14. The method of claim 13, wherein the mounting step includes mounting a rack-and-pinion housing of an optical instrument on a profile column of an optical instrument.

15. The method of claim 13, wherein the mounting step includes setting a backlash between a pinion of the rack-and-pinion housing and a rack of the profile column.

16. The method of claim 15, wherein the setting step includes inserting a distance piece into an upper cutout between the rack and pinion housing and the rack of the profile column.

17. The method of claim 16, wherein the setting step includes aligning the rack-and-pinion housing on the profile column by inserting wedges into mutually opposite cutouts between the rack-and-pinion housing and the profile column.

18. The method of claim 13, wherein the placing step includes placing the plurality of sliding elements in corresponding grooves of the rack-and-pinion housing such that the spring lugs point toward the rack-and-pinion housing and sliding surfaces of the plurality of sliding elements press into guide tracks of the profile column.

19. The method of claim 17, further comprising, after the step of curing the adhesive, the step of removing the distance piece and the wedges.

* * * * *